United States Patent Office 3,143,542
Patented Aug. 4, 1964

3,143,542
PROCESS FOR THE REDUCTION OF ORGANIC
COMPOUNDS
Karl Ziegler, 1 Kaiser-Wilhelm-Platz, Mulheim an der Ruhr, Germany, and Josef Schneider and Kurt Schneider, Mulheim an der Ruhr, Germany; said Josef Schneider and said Kurt Schneider assignors to said Karl Ziegler
No Drawing. Filed Mar. 29, 1961, Ser. No. 99,021
Claims priority, application Germany July 21, 1955
19 Claims. (Cl. 260—239)

This invention which is a continuation in part of copending application Serial No. 597,863 filed July 16, 1956, now abandoned, relates to the reduction of organic compounds, and provides a process for the reaction of organic compounds which contain multiple linkages between carbon and oxygen and/or carbon and nitrogen, such as aldehydes, ketones, carboxylic acids, their anhydrides and esters, lactones, acid amides, nitriles, lactams and oximes. The compounds containing these linkages can also be substituted, such as halogeno-carboxylic acids or amino-carboxylic acids, their esters or aminonitriles. The term "reduction" as herein used is, as usual in organic chemistry, understood to be the introduction of hydrogen into the functional group to be reduced.

In accordance with the invention it has been found that such compounds can be conveniently and cheaply reduced with good yields by using, as reducing agent, organic aluminum compounds of the general formula AlRR'R'' in which R and R' represent any desired alkyl groups and R'' represents a hydrogen atom or an alkyl group with more than 2 carbon atoms, or their complex compounds with alkali metal hydrides.

The applicant has already described and proposed numerous processes for the production of alkyl aluminum hydrides. One such process forms the subject of German Patent 918,928. In the patent specification it is stated, inter alia, that the alkyl aluminum hydrides produced in accordance therewith are highly suitable for the reduction of olefins and diolefins and in this respect are far superior to the known lithium aluminum hydride in their effect.

In the publication in "Justus Liebigs Annalen der Chemie," vol. 589 (1954), page 91 et seq., especially pages 93, 94, 103 and 104, the applicant, in conjunction with his collaborators, has shown that olefins with double bonds in the middle position can be reduced by means of dialkyl aluminum hydrides, whereas heating with lithium aluminum hydride as reducing agent does not produce any reduction, but only a decomposition to lithium hydride, hydrogen and aluminum.

In contrast thereto, it is surprising that dialkyl aluminum hydrides are excellent reducing agents for compounds with C=O, C=N— and C≡ groups. In the dialkyl aluminum hydrides, alkyl radicals are directly bonded to aluminum as well as hydrogen. On this basis, it would in principle have been expected that they would react with the CO groups and other groups in the manner of the Grignard reaction, for example by addition. In this case, it would be very difficult to bring about a smooth reaction, since a more or less large part of the material introduced would be uselessly consumed by these addition and like reactions and would not be available for the reduction process. However, it has surprisingly been found that such complications do not arise and that the reactivity of the dialkyl aluminum hydrides is in all respects exhausted after the reaction of the aluminum-hydrogen bond.

As will be shown hereafter, it is unimportant for the principle and consequently for the fundamental understanding of the reduction in accordance with the invention whether the radical R'' in the general formula of the reducing agent AlRR'R'' of the invention is hydrogen or specific alkyl radicals. The reducing agents used in accordance with the invention and wherein R'' means the alkyl radicals discussed in detail hereafter react in a manner in the reaction of the invention as if a hydrogen were actually bonded to the aluminum in place of this alkyl radical R''. Thus, in explaining the reaction mechanism in the process of the invention, one may always start from the fact that the compound to be reduced is treated with an aluminum-organic reducing agent which contains an Al—H group. Since this Al—H group is the essential element for the reducing mechanism of the invention, the reducing agent, viz. a reduction equivalent, is designated hereinafter as >Al—H to facilitate the understanding.

The reaction in accordance with the invention is determined by a conversion principle occurring in any case and governing the entire course of the reaction. This generally valid principle, irrespective of what compounds with the functional groups described are reduced in the process of the invention is the addition of the reducing agent >Al—H into the functional group containing multiple bonds and formed by one carbon atom and at least one hetero atom. This first step which determines the entire occurrence of the reaction always proceeds in the same manner. The reducing agent >Al—H in fact enters the reducing functional group in such a manner that the hydrogen of the reducing agent is bonded to the carbon atom and the radical >Al—, via the aluminum, is bonded to the hetero atom of the functional group irrespective of the type of compounds from which the reduction is started. Thus, in the first step, there will always be obtained a reaction product which contains hydrogen from the reducing agent at the carbon atom of the functional group to be reduced, and the aluminum-containing radical of the reducing agent at the hetero atom of this functional group.

To arrive from this first-step aluminum-containing reduction product to the final aluminum-free reduction product it is necessary in general that, in a second operational step, the aluminum-containing residue of the reducing agent be hydrolytically split from the hetero atom of the functional group. An aqueous hydrolyzing medium will advantageously be used for this hydrolysis step. This hydrolysis also proceeds in a direction which can be exactly pre-determined in each case. The hydrolyzing agent H—OH in fact breaks the linkage between the hetero atom and the aluminum such that the radical OH— is bonded to the aluminum and the remaining H of the hydrolyzing agent is bonded to the hetero atom. Thus, after the second stage of the process of the invention, there is existing a reduction product which, as compared with the starting product, contains two hydrogen atoms more in the functional group, namely one at the carbon atom and the other at the hetero atom of this functional group. The additional hydrogen at the carbon atom was directly derived from the reducing agent and the additional hydrogen at the hetero atom from the hydrolyzing agent. Thus, on an over-all basis and with consideration given to the mode of action of the hydrolyzing agent, two equivalents of hydrogen are introduced by one reduction equivalent into the compound to be reduced.

This reaction mechanism governs not only the simple cases wherein merely C=O groups (such as aldehydes or ketones) or C=N— groupings (such as imines, Schiff's bases or the like) are to be reduced but also cases where, due to the particular constitution of the functional group to be reduced, specific points of view apply in addition. As will become obvious, the course of the reaction in these specific cases will likewise be understandable alone on the basis of the addition described of the reducing agent in the first step when considering the general chemical and basic lawfulness for the reduction products thus formed.

The compounds to be reduced include compounds which, due to their constitution, are capable to react with more than one reduction equivalent >Al—H. A typical example of these are the nitriles which contain triple bonds. As will be shown hereafter, the carboxyl group and its derivatives such as esters, acid amides and the like correspond to the nitriles with respect to reactivity. Thus, it is known that, in the reaction with one reduction equivalent, carboxylic acids and their derivatives can be reduced to the aldehydes while the reaction with an additional reduction equivalent leads to the corresponding primary alcohols. It also is known that the reaction of nitriles with one reduction equivalent results in the imines in the first step and that the reaction with one additional reduction equivalent leads to the completely reduced primary amines. Accordingly, it is possible in accordance with the invention to direct this over-all reaction proceeding in several steps in such a manner that the products of the individual steps can be recovered. Thus, it is possible to react carboxylic acids or their derivatives, after their neutralization which is especially effected with the reducing agent proper, with only one reduction equivalent >Al—H and to isolate the corresponding aldehyde after the hydrolysis, or to cause a second reduction equivalent >Al—H to react simultaneously or successively and to isolate the second stage reduction product (the primary alcohol) after hydrolysis. The same applies analogously to the stepwise reduction of the nitriles.

In completely reducing functional groups of the general formula

by reaction with two reduction equivalents >Al—H, the reaction always proceeds as follows:

First of all, the first reduction equivalent is added to the double bond in the manner described above with formation of the reaction product

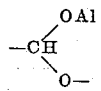

As is known, a compound which bears two oxygen linkages at the same carbon atom is normally unstable. Therefore, in the reaction with a further reduction equivalent >Al—H, the single bond C—O is broken and, instead, the hydrogen atom of the second reduction equivalent is added to the carbon atom so that the group —CH$_2$—OAl< is obtained as the reaction product after the reaction with two reduction equivalents.

A further peculiarity is involved if the group to be reduced has the following configuration:

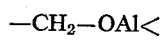

Here again, in the reaction with one reduction equivalent >Al—H, the reducing agent enters the double bond in the first step in accordance with the principle so that the compound

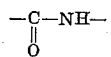

is formed. It also is known from fundamental chemical knowledge that such a grouping where one oxygen and one —NH— group are bonded to the same carbon atom is likewise unstable. Accordingly, in the reaction with a second reduction equivalent >Al—H, the oxygen-containing group at the carbon atom is exchanged for hydrogen so that the grouping —CH$_2$—NH— is formed as the second stage reduction product.

If, in accordance with the invention, dialkyl hydrides are used as the reducing agents, the nature of the alkyl radical is unimportant. Accordingly, the same may be both an n-alkyl radical and any isoalkyl radical. It is generally preferred for economical reasons to use lower alkyl radicals. Particularly suited are alkyl radicals having up to 10 carbon atoms. In case of n-alkyl radicals, the preferred number of carbon atoms is two while isoalkyl radicals having at least 4 carbon atoms are preferred. Particularly suitable reducing agents of these classes are diethyl aluminum hydride and di-isobutyl aluminum hydride.

Certain aluminum trialkyls can be used with equally good results, and in many cases with even better results, instead of the dialkyl aluminum hydrides.

In "Journal für praktische Chemie" (II), vol. 147 (1936), pages 226 et seq., Meerwein, Hinz, Majert and Sönke have shown that aluminum triethyl and chloral react quite smoothly with one another in the following remarkable manner:

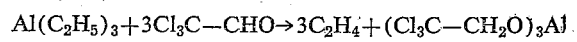

In this reaction, therefore, the aluminum triethyl behaves like a mixture of ethylene and aluminum hydride. The smooth reaction is however restricted to chloral and bromal. Meerwein and collaborators have in fact tried to reduce ketones, aldehydes and their halogen substitution products with aluminum triethyl; however, the description of the experiment shows that the main reaction products are formed by addition of aluminum triethyl to the carbonyl group of the aldehyde or of the ketone, as they would also be formed in the course of the Grignard synthesis. In addition, the reaction between the aldehydes or ketones and the aluminum triethyl is disturbed by primary formation of molecular compounds, which is indicated by intensive coloring of the reaction mixture. Tests carried out by the applicant and his collaborators have confirmed these results. In all cases in which the starting materials of Meerwein are treated with aluminum triethyl in the ratio of 3:1, reduction products are only formed with chloral and bromal, while in all other cases the normal course analogous to the Grignard reaction is predominant.

It has now been found that the extent of the Meerwein reaction can be increased substantially beyond the chloral and bromal if, in place of aluminum triethyl, use is made of aluminum trialkyls which contain at least one isoalkyl radical. In this case, aluminum trialkyls in which this isoalkyl radical is branched at the second carbon atom, seen from the aluminum, i.e. in its beta position, are used in accordance with the invention. In particular, this isoalcohol radical branched in beta position contains at least four carbon atoms. Besides, the exact constitution of the isoalkyl radical is in fact without importance. However, for economic reasons, it is preferred also in this case to use aluminum compounds which contain lower isoalkyl radicals, especially those containing up to 10 carbon atoms. Particularly suited are aluminum trialkyls which contain the isobutyl radical. It is further preferred to use aluminum trialkyls in which all of the three alkyl radicals are isoalkyl radicals, the particularly preferred aluminum tri-isoalkyl being aluminum tri-isobutyl. For example, if aluminum triisobutyl is used as the reducing agent, not only is it possible to reduce 3 moles of chloral or of bromal with 1 mol of reducing agent but 3 moles of any desired aldehyde of the benzaldehyde or cinnamaldehyde type can be reduced with 1 mole of reducing agent. In this way, it is, for example, possible for cinnamaldehyde to be converted quantitatively into cinnamic alcohol. In the reaction, 3 molecules of isobutylene or analogous olefins are split off. An analogous result can also be obtained with diisoalkyl aluminum hydrides of the diisobutyl aluminum hydride type as reducing agent, in which case, of course, only 2 moles of isobutylene are liberated.

This analogy between diisobutyl aluminum hydride and aluminum triisobutyl or between analogous compounds is also shown in many cases in which the aluminum compounds do not develop 3 reduction equivalents, but only 1 reduction equivalent as, for example, in the reduction of acid esters, ketones and nitriles. It is, therefore, always possible to use an aluminum triisoalkyl, for example aluminum triisobutyl, instead of a diisoalkyl aluminum hydride with equally good results. In such a case, one molecule of isoolefin, for example isobutylene, is split off and the reaction proceeds as with diisoalkyl aluminum hydride. In these cases, however, the remaining two isoalkyl radicals always remain bonded to the aluminum. In this respect, therefore, there is a contrast to the behavior between diethyl aluminum hydride and aluminum triethyl. When aluminum triethyl is used complete utilization is only obtained with chloral or bromal. With other carbonyl compounds, a third of the three reduction equivalents is now and again utilized to a poor extent. The main reaction is the addition according to Grignard. In contrast thereto, diethyl aluminum hydride and its homologues with normal radicals reduce all compounds with multiple bonds between carbon and oxygen and/or between carbon and nitrogen. In this reduction, however, only one reduction equivalent, i.e. the >AlH bond, is effective. The only exception in which the reduction by way of the ethyl groups or alkyl groups uses all three reduction equivalents is in the case of chloral or bromal. The best results are produced with diisobutyl aluminum hydride, aluminum triisobutyl and all compounds of similar structure with branched radicals, in which all three reduction equivalents are effective, and in fact in a substantially greater range of the compounds to be reduced than in the case of the known and previously mentioned aluminum compounds. Any additions similar to the Grignard reaction are never observed with these branched organic aluminum compounds.

For economic reasons, therefore, diethyl aluminum hydride is used in all reactions in which the aluminum compound only acts with one reduction equivalent. The diethyl aluminum hydride contains in connection with the hydrolyzing agent one hydrogen gram-atom available for reduction in 86 g. (1 mole). For diisobutyl aluminum hydride and aluminum triisobutyl, the corresponding figures are 142 and 198 g. In all reduction processes in which 3 reduction equivalents are effective (for example the reduction of chlorinated aldehydes, aromatic aldehydes and unsaturated aldehydes, such as cinnamaldehyde) the best economic effect is obtained with diisobutyl aluminum hydride since in this case two hydrogen gram-atoms are available in just 48 g. The corresponding amount of aluminum triisobutyl is 66 gms.

Taking into account in this respect the relationship between the cost of lithium aluminum hydride which is known as a reducing agent (cf. for example "Organic Reactions," vol. 6 (1951) pp. 470 to 509) and that of aluminum dialkyl hydrides or aluminum trialkyls, which is in the ratio of 100:1, it can readily be estimated that the cheapening of the reduction reactions ought to be between approximately 50:1 in the most favorable case and 5:1 in the most unfavorable case. In the optimum case, i.e. when all four AlH bonds are used, 2 hydrogen atoms are available in 9.5 grms. of lithium aluminum hydride. When only 2 reduction equivalents are utilized, which is frequently the case in practice, the analogous figure is 19 gms. while it is 38 gms. when only 1 reduction equivalent is used.

The reducing agents in accordance with the invention all have the power of adding on alkali metal hydrides. For example, the complex compound

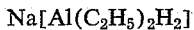

$$Na[Al(C_2H_5)_2H_2]$$

is formed from diethyl aluminum hydride and sodium hydride, the complex compound

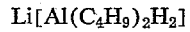

$$Li[Al(C_4H_9)_2H_2]$$

from diisobutyl aluminum hydride and lithium hydride, and the complex compound

$$Na[Al(iC_4H_9)_3H]$$

from aluminum triisobutyl and sodium hydride.

These complex compounds also prosess a similar reducing action to that of the non-complex basic substances. In each case, however, by the adding of the alkali metal hydride, another reduction equivalent is added, so that in many cases the power of reduction is doubled by a slight increase of the molecular weight, since the equivalent for 2H accordingly falls considerably. For example, with a reaction in which 1 mole of aluminum triisobutyl has to be used for 1 mole of the substance to be reduced, the said aluminum triisobutyl has a reduction equivalent of 198, while it has a reduction equivalent of 110.5 after the adding on of sodium hydride. Moreover, when complex compounds with lithium hydride are used, an advantage is produced as compared with the known lithium aluminum hydride, although a substantial advantage of the new reducing agents is that it is possible therewith to avoid the use of the expensive lithium; for lithium aluminum hydride is prepared according to the equation

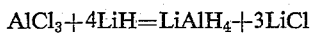

$$AlCl_3 + 4LiH = LiAlH_4 + 3LiCl$$

and, therefore, requires 4 molecules of LiH for 3 reduction equivalents (4×2H), whereas with subsequent addition of 1 molecule of LiH to aluminum trialkyls, a quarter of the amount of Li is sufficient for the same power of reduction.

The reduction products primarily obtained according to the invention contain a comparatively large proportion of aluminum, especially when it has been necessary to use 2 molecules of the reducing agent to each mole of the substance to be reduced, such as is the case, for example, with acid esters. The reaction products are initially decomposed with water to form the reduction product proper and aluminum hydroxide. If the reduction products are sparingly soluble in water, acidification can be effected after the decomposition with water and the reduction products can be separated without any difficulties. However, if the reduction products are readily soluble in water, the procedure adopted in the working up is advantageously as follows. An alcohol having a boiling point which does not conflict with that of the reduction products is added to the latter, and only then is there added that amount of water which is calculated for the decomposition of the Al—C and/or Al—O bonds and/or Al—N bonds. Aluminum hydroxide separates out on heating from the initially clear solution in a form which can be filtered satisfactorily. The alkaline mother liquor which no longer contains any mineral constituents is filtered with suction from the aluminum hydroxide and concentrated by evaporation.

The following examples further illustrate the invention.

Example 1

(a) 17.8 g. (0.09 mol) of aluminium triisobutyl are heated to 80° C. in a three-necked flask provided with a reflux condenser, a stirrer and a dropping funnel. Over a period of 15 minutes, 27.6 g. (0.26 mol) of benzaldehyde—corresponding to a molar ratio of 1:3—are added dropwise. 14.4 g. (0.26 mol) of isobutene escape. The mixture is decomposed with dilute sulphuric acid, taken up in ether and dried over sodium sulphate. After evaporation of the ether, the residue is distilled at 86–88° C./12 mm. The yield of benzyl alcohol is 26 g. (=92% of the theoretical).

In analogous manner:

(b) 37.2 g. of p-chlorobenzyl alcohol (87% of the theoretical), M.P.: 75° C. are obtained from 42 g. (0.3 mol) of p-chloro-benzaldehyde with 20 g. (0.1 mol) of aluminium triisobutyl;

(c) 38.0 g. of anisylalcohol (92% of the theoretical) are obtained from 41 g. (0.3 mol) of anisaldehyde and 20 g. (0.1 mol) of aluminium triisobutyl;

(d) 9.1 g. of furfuryl alcohol (63% of the theoretical) are obtained from 14.4 g. (0.15 mol) of furfurol and 10 g. (0.05 mol) of aluminium triisobutyl;

(e) 11.0 g. of 2-hydroxymethyl thiophene with a B.P. of 205–207° C. are obtained from 16.8 g. (0.15 mol) of thiophenaldehyde and 10.0 g. (0.05 mol) of aluminium triisobutyl.

*Example 2*

(a) 8.1 g. (0.06 mol) of aluminium diisobutyl hydride are slowly added dropwise while stirring to 21.6 g. (0.16 mol) of cinnamaldehyde. In order to complete the reaction, the mixture is heated for a short time to 60–70° C., 6 g. of isobutene being liberated. After decomposition with dilute sulphuric acid, the resulting substance is taken up in ether, the ethereal solution is dried over sodium sulphate and the ether is distilled off. By distilling the residue in vacuo 19.1 g. of cinnamic alcohol pass over at 143° C./12 mm., this corresponding to a yield of 87% of the theoretical.

In analogous manner:

(b) 19 g. (0.15 mol) of 2-ethyl hexenal and 7.2 g. (0.05 mol) of aluminium diisobutyl hydride, with 4.5 g. of isobutene being split off, yield 12.5 g. of 2-ethyl hexenol (colourless liquid with a boiling point of 78–80° C./10 mm.);

(c) 18.3 g. (0.15 mol) of furfuracrolein and 10.0 g. (0.05 mol) of aluminium triisobutyl yield 9.0 g. of furfuryl allyl alcohol (47% of the theoretical) with a B.P. of 108–110° C./4 mm.

*Example 3*

A mixture of 5 g. (0.035 mol) of aluminium diisobutyl hydride and 15 cc. of benzene is slowly added dropwise while stirring to a solution of 20.2 g. (0.1 mol) of α-amyl cinnamaldehyde in 50 cc. of benzene. The mixture is thereby heated to approximately 40° C. The mixture is thereafter heated under reflux for a further half an hour at the boiling point of the benzene. 1.5 litres of isobutene are split off. After completion of the evolution of gas, decomposition is carried out with dilute hydrochloric acid with external cooling. The benzene layer is separated. After evaporation of the solvent, the residue is distilled at 160–161° C./10 mm. The yield of α-amyl cinnamicalcohol (B.P. 161° C./10 mm., $n_D^{20}=1.532$) is 17 g., which corresponds to 83% of the theoretical.

*Example 4*

(a) A solution of 26.8 g. (0.2 mol) of hydrocinnamaldehyde in 100 cc. of dry benzene is heated under reflux at boiling point. 29 g. (0.2 mol) of aluminium diisobutyl hydride are added dropwise. After cooling, the product is mixed with dilute hydrochloric acid, the benzene layer is separated and the aqueous phase extracted by shaking with benzene. After evaporation of the solvent, 15 g. of hydrocinnamicalcohol distill over at 119–121° C./12 mm. This corresponds to a yield of 56% of the theoretical.

(b) In the same manner, 17.5 g. of 2-ethyl butanol can be obtained from 20 g. (0.2 mol) of diethyl acetaldehyde and 29 g. (0.2 mol) of aluminium diisobutyl hydride, this corresponding to a yield of 85.5% of the theoretical.

*Example 5*

18.7 g. (0.084 mol) of trichloracetophenone are added dropwise to 8.3 g. (=0.029 mol) of aluminium triisohexyl

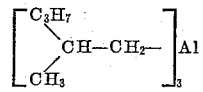

heated to 80° C. Altogether 7.0 g. of isohexene are distilled off at 64° C. By decomposition with dilute sulphuric acid and isolation with ether, it is possible to obtain 17.4 g. of trichloromethyl-phenyl carbinol, boiling at a temperature between 140 and 142° C./12 mm. The yield is 92% of the theoretical.

*Example 6*

(a) 17 g. (0.1 mol) of methyl-nonyl ketone are slowly added dropwise to a solution of 20 g. (0.1 mol) of aluminium diisohexyl hydride

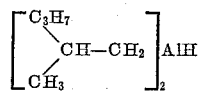

in 50 cc. of benzene. The mixture is heated for a further 30 minutes under reflux and then the reaction mixture is introduced dropwise for decomposition into a mixture of ice and dilute hydrochloric acid. The benzene phase is separated and the benzene and also the isohexane formed in the decomposition are distilled off with a short column. 14.2 g. (83% of the theoretical) of methyl nonyl carbinol, boiling at 121–123° C./17 mm., are obtained by vacuum distillation from the residue.

(b) 12.0 g. of methyl phenyl ethyl carbinol with a B.P. of 121° C./14 mm. are likewise obtained from 15.0 g. (0.1 mol) of benzyl acetone and 20 g. (0.1 mol) of aluminium diisohexyl hydride, the yield being 80% of the theoretical.

*Example 7*

(a) A solution of 10 g. (0.055 mol) of fluorenone in 50 cc. of benzene is caused to flow into a solution of 5.0 f. (0.06 mol) of aluminum diethyl hydride in 50 cc. of benzene. After hydrolysis of the product with dilute sulphuric acid, 9.5 g. of fluorenol crystallise out when the separated benzene solution is concentrated by evaporation, this corresponding to a yield of 94% of the theoretical.

(b) In a similar manner, 7.0 g. of benzhydrol, corresponding to 89% of the theoretical, are obtained from 7.8 g. (0.043 mol) of benzophenone and 3.5 g. (0.043 mol) of aluminum diethyl hydride.

(c) 18.5 g. (68% of the theoretical of p,p'-dimethyl aminodiphenyl carbinol (B.P. 94° C.) are obtained from 27.0 g. (0.1 mol) of Michler's ketone with 8.5 g. (0.1 mol) of aluminum diethyl hydride.

*Example 8*

(a) 16 g. (0.11 mol) of aluminum diisobutyl hydride are added to a solution of 10.5 g. (0.11 mol) of cyclohexanone in 50 cc. of hexane. The reaction mixture is decomposed with dilute sulphuric acid, the hexane layer is separated and the hexane distilled off. 9.0 g. of cyclohexanol with a melting point of 20–23° C. can be isolated from the residue.

In analogous manner:

(b) 2.0 g. of civetol with the melting point of 65° C. (yield: 90% of the theoretically) can be obtained from 2.4 g. (0.01 mol) of civetone and 1.5 g. of aluminium diisobutyl hydride;

(c) 11.0 g. of α-oxy-tetrahydronaphthalene (74% of the theoretical), boiling at 102° C./1 mm. can be obtained from 14.6 g. (0.1 mol) of α-tetralone and 15 g. (0.1 mol) of aluminium diisobutyl hydride.

*Example 9*

A solution of 13.3 g. (0.087 mol) of camphor in 40 cc. of hexane is added dropwise to 18.1 g. (0.091 mol) of aluminum triisobutyl, which is heated to 70° C. The reaction leading to 4.9 g. of isobutene being split off proceeds practically quantitatively in a few minutes. The reaction mixture, decomposed with dilute sulphuric acid, is shaken several times with hexane after separating the hexane layer. Upon evaporating the combined hexane extracts, 15.0 g. of a mixture of borneol and isoborneol crystallise out, the said mixture melting at 208–210° C.

*Example 10*

A solution of 16.8 g. (0.1 mol) of cyclodecandione-1,6 in 100 cc. of benzene is run into 30 g. (0.2 mol) of aluminium diisobutyl hydride heated to 85° C. The mixture is thereafter heated for a further 30 minutes under reflux. The reaction mixture is decomposed with dilute sulphuric acid, the benzene layer is separated from the aqueous phase and the benzene is distilled off; 11.0 g. of cyclodecane-1,6-diol with a M.P. of 150° C. remain, this corresponding to a yield of 64% of the theoretical.

*Example 11*

A mixture of 2.3 g. (0.015 mol) of aluminium diisobutyl hydride and 10 cc. of ether is slowly added dropwise to a suspension of 2.0 g. of oestrone (0.0074 mol) in 50 cc. of ether. The flaky deposit initially occurring dissolves completely during the reaction. Heating is continued for another 30 minutes with reflux of the ether and thereafter a mixture of 25 cc. of n-propanol and 25 cc. of ether is added. 1 cc. of water is carefully added dropwise and the reaction mixture is heated for several hours under reflux. Aluminium hydroxide separates out in a form which can be satisfactorily filtered. The precipitate is filtered off with suction and the clear solution is evaporated to dryness. The residue consists of 1.3 g. of oestradiol with a M.P. of 169–171° C., this corresponding to a yield of 65% of the theoretical.

*Example 12*

1.25 g. (0.004 mol) androstene dione enolethyl ether are dissolved in 25 cc. of dry benzene. A solution of 0.5 g. of aluminium diethyl hydride in 10 cc. of benzene is added dropwise. The mixture is then decomposed by adding dilute hydrochloride acid without external cooling, the reaction mixture being thus heated to approximately 50° C. The result is that the primarily formed 3-enolic ether of testosterone is simultaneously split off. By separating and working up the ethereal solution, testosterone is accordingly obtained directly with a yield of 0.93 g. which equals 82% of the theoretical. After being dissolved and recrystallised from acetic ester, the product melts at 152° C., and gives an optical rotation of +107° (in ethanol).

*Example 13*

(a) 12.6 g. (0.071 mol) of trichloroacetic acid methyl ester are added dropwise to 28.6 g. (0.144 mol) of aluminium triisobutyl; there is active development of isobutene with strong heating. The reaction ceases at 60° C. after approximately 15 minutes, 7.7 g. of isobutene being split off. By decomposition of the product with dilute sulphuric acid and isolation with ether, there are obtained 12.5 g. of trichlorethanol with a B.P. of 49° C./13 mm. (yield=84% of the theoretical).

In a similar manner:

(b) 7.6 g. of benzyl alcohol (90.4% of the theoretical) are obtained from 10.6 g. (0.078 mol) of methyl benzoate and 31.6 g. (0.16 mol) of aluminium triisobutyl;

(c) 9.3 g. of decanol-(1) (95% of the theoretical) are obtained from 11.0 g. (0.062 mol) of capric acid methyl ester with 25.7 g. (0.13 mol) of aluminium triisobutyl;

(d) 3.5 g. of furfuryl alcohol (71% of the theoretical) are obtained from 6.3 g. (0.05 mol) of pyromucic acid methyl ester with 20 g. (0.1 mol) of aluminium triisobutyl;

(e) 3.2% g. (57% of the theoretical) of pyridine-3-carbinol with a boiling point of 144° C./10 mm. are obtained from 7 g. (0.05 mol) of nicotinic acid methyl ester with 20 g. (0.1 mol) of aluminium triisobutyl.

*Example 14*

(a) 17 g. (0.1 mol) of sodium aluminium diisobutyl dihydride are dissolved in 100 cc. of dry xylene and heated until the xylene boils under reflux. A solution of 13.5 g. of brassylic acid dimethyl ester (0.05 mol) in 100 cc. of xylene are run in from a dropping funnel over a period of 30 minutes. After cooling, decomposition is effected by dilute hydrochloric acid being added dropwise and the xylene solution is separated out. Some of the diol formed crystallises out of the aqueous phase, the said diol being dissolved with further xylene. 8.2 g. of tridecanediol-1,13 (76% of the theoretical) are obtained after evaporating the xylene solutions.

(b) In analogous manner, 16 g. of decanediol-1,10 were obtained (a yield of 92%) from 11.5 g. (0.05 mol) of sebacic acid dimethyl ester with 17.0 g. (0.1 mol) of sodium aluminium diisobutyl dihydride.

*Example 15*

(a) 9.6 g. (0.05 mol) of dimethyl terephthalate are suspended in 50 cc. of benzene. 16.5 g. (0.2 mol) of aluminium diethyl hydride in 15 cc. of benzene are added dropwise with vigorous stirring. The reaction mixture is heated to 75° C. and a colourless clear solution is formed. Decomposition is effected initially with a mixture of 20 cc. of dry butanol and 15 cc. of benzene. A solution of 6 cc. of water in 5 cc. of methanol is then added dropwise. The initially gelatinous mass becomes liquid again by further dilution with benzene and vigorous stirring and aluminium hydroxide precipitates in a form which can be satisfactorily filtered. The precipitate is filtered off with suction and washed with methanol. After evaporation of the solvent, finally in water-jet vacuum, the diol is left in a yield of 5.6 g. corresponding to 81% of the theoretical, in the form of a colourless crystal line mass with a melting point of 117° C.

(b) In analogous manner, 4.0 g. of hexanediene-(2,4)-diol-(1,6) with a melting point of 104° C. are obtained from 8.5 g. (0.05 mol) of muconic acid dimethyl ester and 16.5 g. (0.2 mol) of aluminium diethyl hydride. (The yield is 70% of the theoretical.)

*Example 16*

(a) 8.6 g. of butyrolactone are slowly added to 29.0 g. of aluminium diisobutyl hydride (0.2 mol). The reaction takes place instantaneously, heat being developed. For decomposition of the reaction mixture, there are initially added dropwise 50 cc. of dry butanol, this being followed by 10 cc. of water in 50 cc. of methanol. The resulting precipitate of aluminium hydroxide is filtered off with suction and washed with methanol. The solvents are distilled off from the combined solutions in a short column. From the residue, it is possible to distil out 6.0 g. of butanediol (1,4) in vacuo, this representing a yield of 67% of the theoretical. The boiling point thereof is 119–121° C./10 mm. After standing for some time, the initially oily distillate solidifies to form crystals (melting point 18–19° C.).

(b) In analogous manner, 4.0 g. (83% of the theoretical) of pentadecanediol-(1,15) with a M.P. of 87–88° C. are obtained from 4.8 g. (0.05 mol) of pentadecanolide and 15 g. (0.1 mol) of aluminium diisobutyl hydride.

*Example 17*

(a) A mixture of 5.16 g. (0.05 mol) of benzonitrile and 20.8 g. (0.1 mol) of aluminium triisobutyl is heated for 4 hours to 80° C. After decomposition of the reaction mixture with excess dilute hydrochloric acid, the amine is liberated by saturation with solid sodium hydroxide and it is dissolved in ether. The ethereal solution dried over sodium hydroxide leaves 4.5 g. of benzylamine (84% of the theoretical) after evaporation of the ether, the said amine boiling at 64° C./10 mm. Picrate: M.P. 198° C.

(b) In analogous manner, 10.2 g. (0.053 mol) of decamethylene dicarboxylic acid dinitrile with 44.2 g. (0.22 mol) of aluminium diisobutyl hydride produce 8.4 g. of 1,12-diaminododecane with a M.P. of 66% C. (Yield: 78% of the theoretical.)

*Example 18*

18.5 g. (0.1 mol) of undecylenic acid are dissolved in 100 cc. of benzene and the mixture is heated under reflux to the boiling point of the benzene. A solution of 5 g. (0.035 mol) of aluminium diisobutyl hydride in 10 cc. of benzene is initially added dropwise. 2.4 litres of a gas consisting of hydrogen and isobutane in the ratio of 1:2 escape. The amount of aluminium diisobutyl hydride (29 g.=0.2 mol) necessary for reduction purposes is thereafter added in 50 cc. of benzene. The mixture is heated for some time under reflux and, after cooling, decomposition is carried out by adding the mixture dropwise to a mixture of dilute hydrochloric acid and ice. The benzene layer is separated and the aqueous phase is shaken several times with benzene. The solvent is evaporated from the combined benzene extracts. Distillation of the residue yield 15 g. (81% of the theoretical) of undecenol, which boils at 135° C./15 mm.

*Example 19*

(a) 5 g. (0.035 mol) of aluminum diisobutyl hydride are added dropwise for neutralisation purposes to a solution of 11.4 g. (0.1 mol) of trifluoroacetic acid in 50 cc. of absolute ether, the said solution being cooled to −10° C. Thereafter, another 14.5 g. (0.1 mol) of aluminum diisobutyl hydride are added dropwise. The reaction temperature during this operation should not exceed 0° C. By careful decomposition with dilute sulphuric acid with external cooling, 4.5 g. (35% of the theoretical) of fluoral hydrate with a B.P. of 105–106° C. are obtained by working up the ether layer.

(b) If 11.4 g. (0.1 mol) of trifluoroacetic acid are reacted with 29 g. (0.2 mol) of aluminum diisobutyl hydride at 20–30° C., 6.5 g. of trifluoroethanol with a B.P. of 73–74° C. are obtained in a yield of 60%.

*Example 20*

(a) A mixture of 22.0 g. (0.27 mol) of aluminum diethyl hydride and 50 cc. of benzene is introduced dropwise into a solution of 10.0 g. of tetrahydrophthalic acid anhydride, the addition product of butadiene and maleic acid anhydride, (0.066 mol) in 100 cc. of benzene, the said solution boiling under reflux. The reaction mixture is decomposed by adding it dropwise to hydrochloric acid diluted with ice. By working up the benzene layer, there are obtained 6.0 g. of 1,2-dimethylol cyclohexene-4 with a B.P. of 170–173° C./11 mm. (64% of the theoretical).

In analogous manner:

(b) 11.0 g. (0.067 mol) of endomethylene tetrahydrophthalic anhydride with 22 g. (0.27 mol) of aluminum diethyl hydride yield 4 g. (37% of the theoretical) of Δ4-endomethylene-tetrahydrophthaldiol with a M.P. of 82° C.;

(c) 6.9 g. (0.025 mol) of endoanthracenemaleic acid anhydride with 8.5 g. (0.1 mol) of aluminum diethyl hydride yield 2.6 g. (39% of the theoretical) of 9,10-anthracene diethanol with a M.P. of 216° C.

*Example 21*

A solution of 20 g. (0.1 mol of N-cyclohexyl benzamide

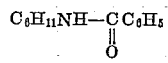

in 200 cc. of absolute toluene is heated to boiling point under reflux and 45 g. (0.3 mol) of aluminum diisobutyl hydride are added dropwise. After cooling, the mixture is decomposed with dilute caustic soda solution, the aqueous phase is saturated with solid sodium hydroxide, and the toluene layer is separated and dried over sodium hydroxide. After distilling off the toluene, 12 g. (65% of the theoretical) of N-cyclohexyl benzylamine are obtained by distilling the residue in vacuo at 154° C./50 mm.

*Example 22*

(a) A mixture of 45 g. (0.56 mol) of aluminum diethyl hydride and 50 cc. of benzene is caused to flow into a boiling solution of 21.0 g. (0.185 mol) of caprolactam in 200 cc. of benzene. Decomposition is effected by adding the mixture dropwise to excess hydrochloric acid and then the benzene is separated. After saturating the hydrochloric acid solution with solid sodium hydroxide, the amine is distilled over with steam. To separate the amine, the distillate is saturated with sodium hydroxide, extracted with ether and in this way, after evaporation of the ether, there are obtained 13.5 g. (73% of the theoretical) of hexamethylene imine, which boils at 40–42° C./20 mm.

(b) In analogous manner, 4.1 g. (66% of the theoretical) of decamethylene imine can be obtained from 7.0 g. (0.041 mol) of cyclodecanone isoxime and 10.5 g. (0.125 mol) of aluminum diethyl hydride.

*Example 23*

(a) 10.0 g. (0.0475 mol) of benzoyl methyl anilide are dissolved in 50 cc. of absolute ether. 7 g. (0.049 mol) of aluminum diisobutyl hydride in 5 cc. of ether are added dropwise with vigorous stirring over a period of 1 hour. The mixture is stirred for a further hour and is then decomposed with 25 cc. of 5 N-sulphuric acid. By working up the ether layer, 1.5 g. of benzaldehyde, boiling at 96–98° C./25 mm. are obtained, this corresponding to a yield of 30% of the theoretical.

(b) By adding 15 g. (0.1 mol) of aluminium diisobutyl hydride to 10 g. (0.0475 mol) of benzoyl methyl anilide in ether, it is possible to obtain 4.0 g. of benzyl alcohol, this corresponding to a yield of 75%.

*Example 24*

1.9 g. (0.022 mol) of aluminium diethyl hydride is dissolved in 50 cc. of absolute ether and cooled to −60° C. A solution of 3.4 g. (0.011 mol) of vitamin-A-acid methyl ester in 50 cc. of ether is added dropwise in such a way that the temperature does not exceed −50° C. After completion of the addition, the mixture is stirred for approximately another hour at about −20° C. and the mixture is then carefully decomposed at −20 to −10° C., with 20 cc. of methanol, which contains 0.5 cc. of water. The precipitate formed is filtered off with suction and washed with ether. The filtrate is concentrated in vacuo in a water bath at a temperature of 440° C. and the residue is freed from traces of solvent under high vacuum, the vitamin-A alcohol remaining in the form of a viscous orange-coloured oil. The yield is 2.7 g., this corresponding to 85.5% of the theoretical.

*Example 25*

5 g. (0.35 mol) of aluminum diisobutyl hydride are initially caused to flow into a solution of 15.1 g. (0.1 mol) of anthranilic acid methyl ester in 50 cc. of benzene. When evolution of gas has terminated, another 29 g. (0.2 mol) of aluminum diisobutyl hydride in 50 cc. of benzene are added dropwise. For decomposition purposes, there are initially added 25 cc. of secondary butanol, and thereafter a mixture of 5 cc. of water and 50 cc. of methanol. The precipitate is filtered off with suction and washed with methanol. The filtrate is concentrated by evaporation and the residue is dissolved in and recrystallised from petroleum ether. 7.5 g. of aminobenzyl alcohol with a M.P. of 80–81° C. are obtained, this corresponding to 61% of the theoretical.

*Example 26*

(a) 43 g. (0.30 mol) of aluminum diisobutyl hydride are added dropwise to 84 g. (0.01 mol) of aminobutyronitrile and the mixture is stirred for one hour at 50–60° C. After cooling, the reaction mixture is introduced dropwise into 250 cc. of methanol, this containing 15 cc. of water. The precipitated aluminum hydroxide is filtered off with suction, washed with methanol and the methanol is distilled off in a column. By distilling the residue, 5.5 g. (62% of the theoretical) of 1,2-diaminobutane distil over at 134–137° C., this yielding a picrate with a melting point of 256° C. (with decomposition).

(b) In analogous manner, 11.2 g. (0.1 mol) of diethyl aminoacetonitrile with 30 g. (0.2 mol) of aluminum diisobutyl hydride yielded 6.5 g. (56% of the theoretical) of N,N-diethylethylene diamine with a B.P. of 145° C. (Picrate M.P.: 208° C. with decomposition.)

Example 27

(a) 18.0 g. (0.1 mol) of benzal aniline are dissolved in 50 cc. of benzene and 14.5 g. (0.1 mol) of aluminum diisobutyl hydride are added dropwise while stirring. For decomposition purposes, there are initially introduced 25 cc. of secondary butanol, this being followed by a mixture of 8 cc. of water and 50 cc. of benzene. The precipitate is filtered off with suction, washed with methanol and the filtrate separated by suction in a water-jet vacuum. After the concentrated solution has stood in a refrigerator, 12.5 gms. (69% of the theoretical) of benzyl aniline with a melting point of 34° C. crystallize out of the solution.

(b) In a similar manner, quinoline can be hydrogenated to dihydroquinoline.

Example 28

5.9 gms. (0.05 moles of p-tolunitrile and 100 cc. of benzene are heated to 40° C. and mixed with 15.0 gms. (0.105 moles) of aluminum diisobutyl hydride while stirring. After 5 hours, heating is continued for 30 minutes at the boiling temperature with reflux, following which the reaction mixture is mixed with excess dilute hydrochloric acid and the benzene layer is separated. The aqueous layer is saturated with solid sodium hydroxide and the oil which separates is taken up with ether. Upon evaporation of the ether, 5.1 gms. of 4-methyl-benzylamine are obtained (boiling point 95° C. at 40 mm. Hg, melting point of the picrate, 195° C.), which corresponds to a yield of 86% of the theory.

If, deviating from the above procedure, the quantity mentioned of p-tolunitrile in benzene is mixed with exactly 7.1 gms. (0.05 moles) of aluminum diisobutyl hydride and the reaction is terminated after heating at 40° C. for 1 hour, the aldehyde can be isolated as intermediate product as follows: The benzene is removed under vacuum, the residue is dissolved in ether and decomposed with 2-normal sulfuric acid. This is followed by heating the mixture for 1 hour to a bath temperature of 40° C. while stirring, separating the ether layer, washing to neutrality and drying over sodium sulfate. Upon evaporation of the ether, there are obtained 5.2 gms. p-toluyl aldehyde (boiling point, 90° C. at 40 mm. Hg; melting point of the phenyl hydrazone, 111° C.), which corresponds to a yield of 87% of the theoretical.

Example 29

(a) 15.2 gms. (0.06 moles) of diisooctyl aluminum hydride

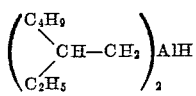

are slowly mixed with 15 gms. (0.16 moles) of benzaldehyde while stirring. The mixture is heated for at least 30 minutes at 70° to 80° C. under vacuum to bring the reaction to completion and to distil off the 2-ethyl-hexene-(1) which has formed. The olefin split off is found almost quantitatively in a cooled receiver. (In case of larger batches, it can be used to recover the reducing agent by means of the known reaction

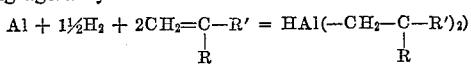

After decomposition with dilute sulfuric acid, the resultant product is worked up in conventional manner. There are obtained 14.0 gms. of benzyl alcohol (boiling point, 63° C. at 3 mm. Hg).

(b) In an analogous manner, 8 gms. of 2-ethyl-butene-(1) split off are recovered from 11.9 gms. (0.06 moles)

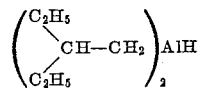

and 15 gms. benzaldehyde (0.16 moles) while benzyl alcohol is obtained in the same yield as before.

What we claim is:

1. In the reduction of an organic compound containing a functional group consisting of carbon and another element selected from the group consisting of oxygen and nitrogen and containing a multiple bond between said carbon and said other element, the step of reducing such multiple bond to a bond of lesser number, which comprises reacting said compound with a reducing agent selected from the group consisting of aluminum dialkyl hydrides, aluminum trialkyls in which aluminum trialkyls at least one alkyl is an isoalkyl being branched at the $\beta$ carbon atom and their addition compounds with one mole of an alkali metal hydride to produce a reaction product in which hydrogen supplied by said reducing agent is added to said carbon and the aluminum-containing radical of said reducing agent is added to said other element whereby the number of bonds in said multiple bond is reduced.

2. The process of claim 1, in which said reducing agent is an aluminum dialkyl hydride the alkyl groups of which have up to 10 carbon atoms.

3. The process of claim 1, in which said reducing agent is a di-n-alkyl aluminum hydride the alkyl groups of which have two to ten carbon atoms.

4. The process of claim 1, in which said reducing agent is a di-isoalkyl aluminum hydride having isoalkyl groups with at least four carbon atoms.

5. The process of claim 1, in which said reducing agent is a tri-isoalkyl aluminum compound having isoalkyl groups being branched in the $\beta$-position.

6. The process of claim 1, in which said reducing agent is aluminum diethyl hydride.

7. The process of claim 1, in which said reducing agent is aluminum diisobutyl hydride.

8. The process of claim 1, in which said reducing agent is aluminum tri-isobutyl.

9. The process of claim 1 in which said reducing agent is an addition compound of an aluminum di-isoalkyl hydride with one mole of an alkali metal hydride.

10. The process of claim 1 in which said reducing agent is an addition compound of an aluminum tri-isoalkyl with one mole of an alkali metal hydride.

11. The process of claim 1 in which an aqueous medium is added to said aluminum-containing reaction product thereby hydrolyzing said reaction product to form a second reaction product which contains additional hydrogen on said other element of the functional group, which hydrogen is added to said other element by the hydrolysis reaction.

12. The process of claim 11 comprising in addition adding an acid to the decomposition products obtained upon the addition of said aqueous medium.

13. The process of claim 11, comprising in addition adding an alcohol to the first reaction product, then adding a calculated amount of water required for the hydrolysis of said first reaction product to said second reaction product, filtering off the aluminum hydroxide which is formed during the hydrolysis, and evaporating the alcoholic liquor.

14. The process of claim 13, in which said alcohol is secondary n-butanol.

15. The process of claim 1 in which the functional group is a carbonyl group.

16. The process of claim 1 in which the functional group is a

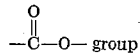

17. The process of claim 1 in which the functional group is a

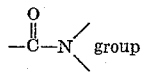

18. The process of claim 1 in which the functional group is a $-C\equiv N$ group.

19. The process of claim 1 in which the functional group is a $-C=N-$ group.

References Cited in the file of this patent

FOREIGN PATENTS

| | | |
|---|---|---|
| 801,416 | Great Britain | Sept. 10, 1958 |
| 801,417 | Great Britain | Sept. 10, 1958 |

OTHER REFERENCES

Meerwein et al.: J. Prakt. Chem. II, vol. 147, pp. 226–240 (1936).

Zeigler et al. (I): Liebigs Ann., vol. 589, pp. 91–121 (1954).

Zeigler et al. (II): Angew. Chem., vol. 67, pp. 424–26 (1955).

Gaylord: "Reduction with Complex Metal Hydrides," (Interscience Pub.), pp. 994–100 (1956).